US011875450B2

(12) United States Patent
Dabral et al.

(10) Patent No.: US 11,875,450 B2
(45) Date of Patent: *Jan. 16, 2024

(54) SURROUND VIEW

(71) Applicant: TEXAS INSTRUMENTS INCORPORATED, Dallas, TX (US)

(72) Inventors: Shashank Dabral, Allen, TX (US); Vikram Appia, Dallas, TX (US); Hemant Hariyani, Plano, TX (US); Lucas Weaver, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/853,220

(22) Filed: Jun. 29, 2022

(65) Prior Publication Data
US 2022/0335680 A1 Oct. 20, 2022

Related U.S. Application Data

(63) Continuation of application No. 16/519,099, filed on Jul. 23, 2019, now Pat. No. 11,380,046.

(51) Int. Cl.
*G06T 15/20* (2011.01)
*G06T 7/40* (2017.01)
(Continued)

(52) U.S. Cl.
CPC ............... *G06T 15/20* (2013.01); *G06T 1/20* (2013.01); *G06T 5/006* (2013.01); *G06T 7/40* (2013.01);
(Continued)

(58) Field of Classification Search
CPC ......... G06T 3/0031; G06T 3/005; G06T 7/55; G06T 7/70; G06T 19/006; H04N 13/282; H04N 13/271
See application file for complete search history.

(56) References Cited

U.S. PATENT DOCUMENTS 11,380,046 B2 *   7/2022  Dabral .................... G06T 5/006
2012/0320039 A1 * 12/2012 Ha ......................... G06T 19/006
                                                              345/419
(Continued)

OTHER PUBLICATIONS

Vikram Appia, Hemant Hariyani, Shiju Sivasankaran, Stanley Liu, Kedar Chitnis, Martin Mueller, Umit Batur, Gaurav Agarwal, Embedded Processing Texas Instruments, "Surroud View Camera System for ADAS on TI's TDAx SoCs," Oct. 2015, Texas Instruments, 18 pages.

(Continued)

Primary Examiner — Todd Buttram
(74) Attorney, Agent, or Firm — Brian D. Graham; Frank D. Cimino

(57) ABSTRACT

A system on a chip (SoC) includes a digital signal processor (DSP) and a graphics processing unit (GPU) coupled to the DSP. The DSP is configured to receive a stream of received depth measurements and generate a virtual bowl surface based on the stream of received depth measurements. The DSP is also configured to generate a bowl to physical camera mapping based on the virtual bowl surface. The GPU is configured to receive a first texture and receive a second texture. The GPU is also configured to perform physical camera to virtual camera transformation on the first texture and on the second texture, based on the bowl to physical camera mapping, to generate an output image.

20 Claims, 10 Drawing Sheets

(51) Int. Cl.

| | |
|---|---|
| *G06T 1/20* | (2006.01) |
| *G06T 15/00* | (2011.01) |
| *G06T 15/04* | (2011.01) |
| *H04N 13/111* | (2018.01) |
| *G06T 5/00* | (2006.01) |
| *B60R 1/00* | (2022.01) |

(52) U.S. Cl.
CPC ............ *G06T 15/04* (2013.01); *H04N 13/111* (2018.05); *B60R 1/00* (2013.01); *B60R 2300/105* (2013.01); *B60R 2300/30* (2013.01); *B60R 2300/306* (2013.01); *G06T 2207/30252* (2013.01)

(56) References Cited

U.S. PATENT DOCUMENTS

| | | | |
|---|---|---|---|
| 2014/0192048 A1 | 7/2014 | Johansson et al. | |
| 2017/0025024 A1* | 1/2017 | Kabrt | ................ G08G 5/04 |
| 2017/0195564 A1* | 7/2017 | Appia | ................ B60R 1/00 |
| 2019/0340775 A1* | 11/2019 | Lee | ................ G05D 1/024 |
| 2019/0349571 A1* | 11/2019 | Herman | ................ H04N 23/698 |
| 2021/0027522 A1* | 1/2021 | Dabral | ................ G06T 15/04 |
| 2022/0335680 A1* | 10/2022 | Dabral | ................ G06T 3/4038 |

OTHER PUBLICATIONS

Weaver, L., et al., "Optimization of GPU-Based Surround View on TI's TDA2x SoC," Texas Instruments, Application Report, SPRACB4, Oct. 2017, 6 pages.

* cited by examiner

SURROUND VIEW

This application is a continuation of U.S. patent application Ser. No. 16/519,099, filed on Jul. 23, 2019, the entire content of which is incorporated by reference herein.

TECHNICAL FIELD

The present application relates in general to video imaging, and, in particular, to techniques for surround view.

BACKGROUND

Driven by advanced safety features, the automotive industry is increasing the number and variety of sensors deployed in vehicles, as well as the corresponding computational capacity in automotive systems. For example, advanced driver assistance systems (ADAS) may be used for automated parking, autonomous driving, and other safety assistance applications. Multiple video sensors mounted on a vehicle may be used in a surround view system for obtaining a surround view of the vehicle.

SUMMARY

An example system on a chip (SoC) includes a digital signal processor (DSP) and a graphics processing unit (GPU) coupled to the DSP. The DSP is configured to receive a stream of received depth measurements and generate a virtual bowl surface based on the stream of received depth measurements. The DSP is also configured to generate a bowl to physical camera mapping based on the virtual bowl surface. The GPU is configured to receive a first texture and receive a second texture. The GPU is also configured to perform physical camera to virtual camera transformation on the first texture and on the second texture, based on the bowl to physical camera mapping, to generate an output image.

An example device includes a processor, a memory coupled to the processor, and a non-transitory computer readable storage medium storing a program for execution by the processor. The program includes instructions to receive a first stream of received depth measurements in a first direction from a first depth sensor and determine a depth of a first flagged object based on the first stream of received depth measurements. The program also includes instructions to generate a virtual bowl surface, in response to determining that a difference between the depth of the first flagged object and a first depth of predominant object variable in the first direction is greater than a threshold depth difference and store the virtual bowl surface in the memory.

An example method of surround view includes receiving, by a processor, a stream of received depth measurements and determining, by the processor, a depth of a first flagged object based on the stream of received depth measurements. The method also includes updating, by the processor, a first portion of a virtual bowl surface, while maintaining a second portion of the virtual bowl surface, based on the depth of the first flagged object, to generate an updated virtual bowl surface and determining, by the processor, a bowl to physical camera mapping, based on the updated virtual bowl surface. Additionally, the method includes storing, by the processor in memory, the bowl to physical camera mapping and the virtual bowl surface.

DETAILED DESCRIPTION

Automotive systems are increasingly configured with sensors, for example for advanced driver assistance systems (ADAS). A vehicle, such as an automobile, may have multiple physical cameras mounted on it for a surround view system, to create a 360 degree view around the vehicle. Surround view (SRV) systems perform physical camera to virtual camera transformations on textures, or images, from multiple physical cameras to a virtual camera, using a virtual bowl surface. The virtual bowl surface may be flat close to the vehicle and curved farther away from the vehicle. The physical camera to virtual camera transformations may use mappings, such as bowl to physical camera mappings. The virtual camera may also be known as the display. The physical camera to virtual camera transformations are more accurate when the objects are located close to the virtual bowl surface, and more distorted when the objects are located farther away from the virtual bowl surface.

Figure 1:
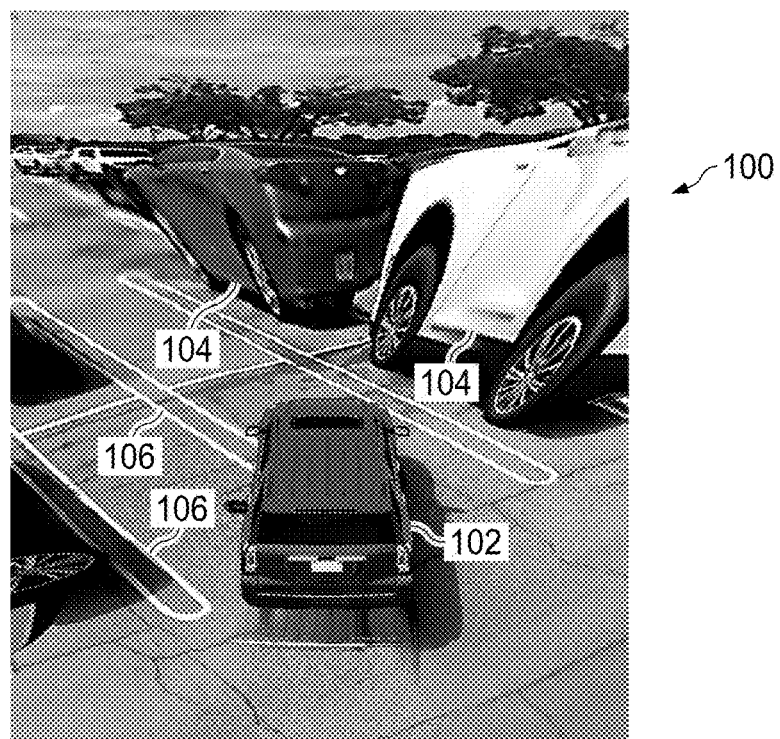
FIG. 1 illustrates an image depicting the monster truck effect.

In automotive systems, much of the imaging is in the road/ground plane, for example lines painted on a parking lot or lane markers, close to a flat region of the virtual bowl surface. However, for objects above the ground plane, such as other vehicles, pedestrians, animals, traffic lights, and signs, significant distortion may occur, causing the objects to appear much larger than they are in reference to the vehicle, leading to the monster truck effect. In the monster truck effect, distortion of the image is triggered by objects lying far in front of the virtual bowl surface, causing the objects to appear significantly larger than they are. For example, an automobile may be distorted to look like a monster truck. FIG. 1 depicts image 100, which demonstrates the monster truck effect. A vehicle 102 is configured with a surround view system. Lane markings 106, which are on the ground close to the flat region of the virtual bowl surface, are accurately rendered by the surround view system. However, vehicles 104 are significantly distorted when rendered by the surround view system, because they are farther from the virtual bowl surface.

In some examples of surround view, physical camera to virtual camera transformation is performed by a graphics processing unit (GPU). To mitigate distortion, the GPU updates the virtual bowl surface, so that the virtual bowl surface better aligns with objects being imaged. However, regenerating the bowl to physical camera mapping is computationally complex, and may involve GPUs with a high amount of processing power, leading to high power dissipation.

In an example surround view system and method, a digital signal processor (DSP) generates a bowl to physical camera mapping. Additionally, the GPU performs rasterization using the bowl to physical camera mapping generated by the DSP. Generating the bowl to physical camera mapping on the DSP reduces the load on the GPU, for example by 5 to 8 times. Accordingly, performance of the surround view system is improved, and the size and power of the GPU are reduced. An example surround view system has low power consumption, because a DSP utilizes less power than a GPU in generating the bowl to physical camera mapping.

In an example, at least one processor updates a virtual bowl surface, to generate an updated virtual bowl surface, in response to detecting an event based on streams of received depth measurements. At least one processor may generate the updated virtual bowl surface based on a previous virtual bowl surface. In an example, the at least one processor only updates a portion of the virtual bowl surface in the vicinity of the event that is detected.

An example surround view system has a low computational load, for example using a threshold depth difference in detecting an event. For example, at least one processor only updates a virtual bowl surface in response to determining that the difference between a depth of a flagged object and a depth of predominant object variable is greater than a threshold depth difference. In an example, the at least one processor updates the virtual bowl surface gradually in several steps, to smooth the visual experience of the user. In an example, video output quality is improved, for example using median filtering or Kalman filtering on streams of received depth measurements. In an example, low pass filtering is performed on streams of received depth measurements, reducing noise. An example surround view system is implemented on a system-on-a-chip (SoC). An example surround view system increases the field of view and reduces distortion, improving safety.

Figure 2:
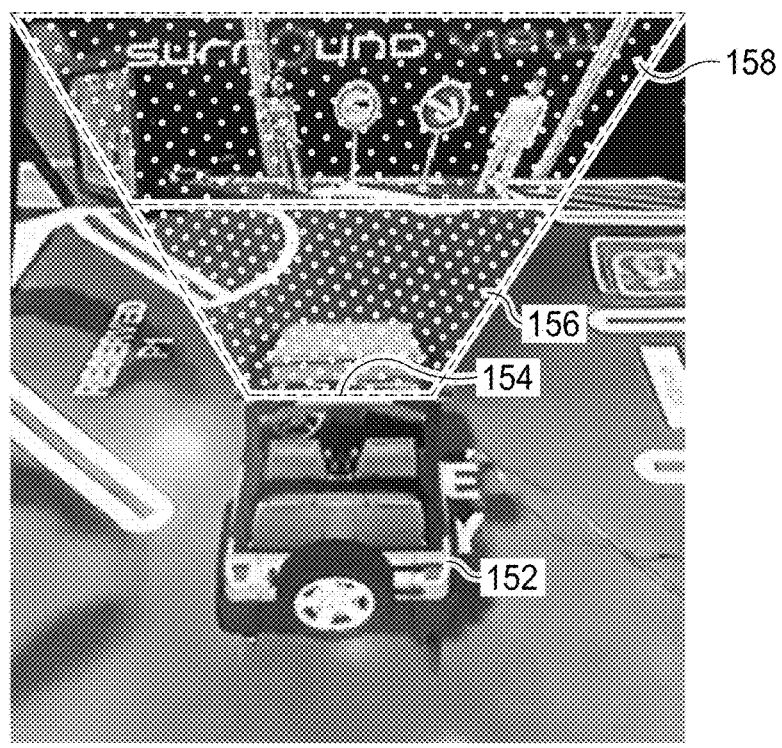
FIG. 2 illustrates an example output of a surround view system.

FIG. 2 illustrates an example output of a surround view system, in which a vehicle 152 contains multiple physical cameras pointed in different directions. The multiple physical cameras have wide angle lenses, known as fish-eye lenses. Three, four, five, six, seven, eight, or more physical cameras may be used to obtain a 360 degree surround view of the vehicle 152. In an example, one physical camera is mounted on a front bumper of the vehicle 152, one physical camera is mounted on a rear bumper of the vehicle 152, and a physical camera is mounted under each side mirror of the vehicle 152. An origin of the physical cameras is defined as the centroid of the coordinates of the physical cameras projected to the ground. A physical camera 154, one of multiple physical cameras, is mounted on the front of the vehicle 152. A region 156, immediately in front of the physical camera 154, images ground features. The surround view system accurately renders the region 156, because features in the region 156 are along the ground, close to a flat region of the virtual bowl surface. However, a region 158, further from the physical camera 154, contains tall objects, such as pedestrians, street signs, and walls. The region 158 may be difficult for the surround view system to accurately render, because at least some parts of the scene in the region 158 are far from the virtual bowl surface.

Surround view systems may perform a physical camera to virtual camera transformation of textures based a bowl to physical camera mapping. At least one processor of the surround view system, for example a DSP, generates the bowl to physical camera mapping based on the virtual bowl surface and the physical camera pose. Also, at least one processor of the surround view system, for example a GPU, performs a physical camera to virtual camera transformation of textures based on the bowl to physical camera mapping.

Figure 3:
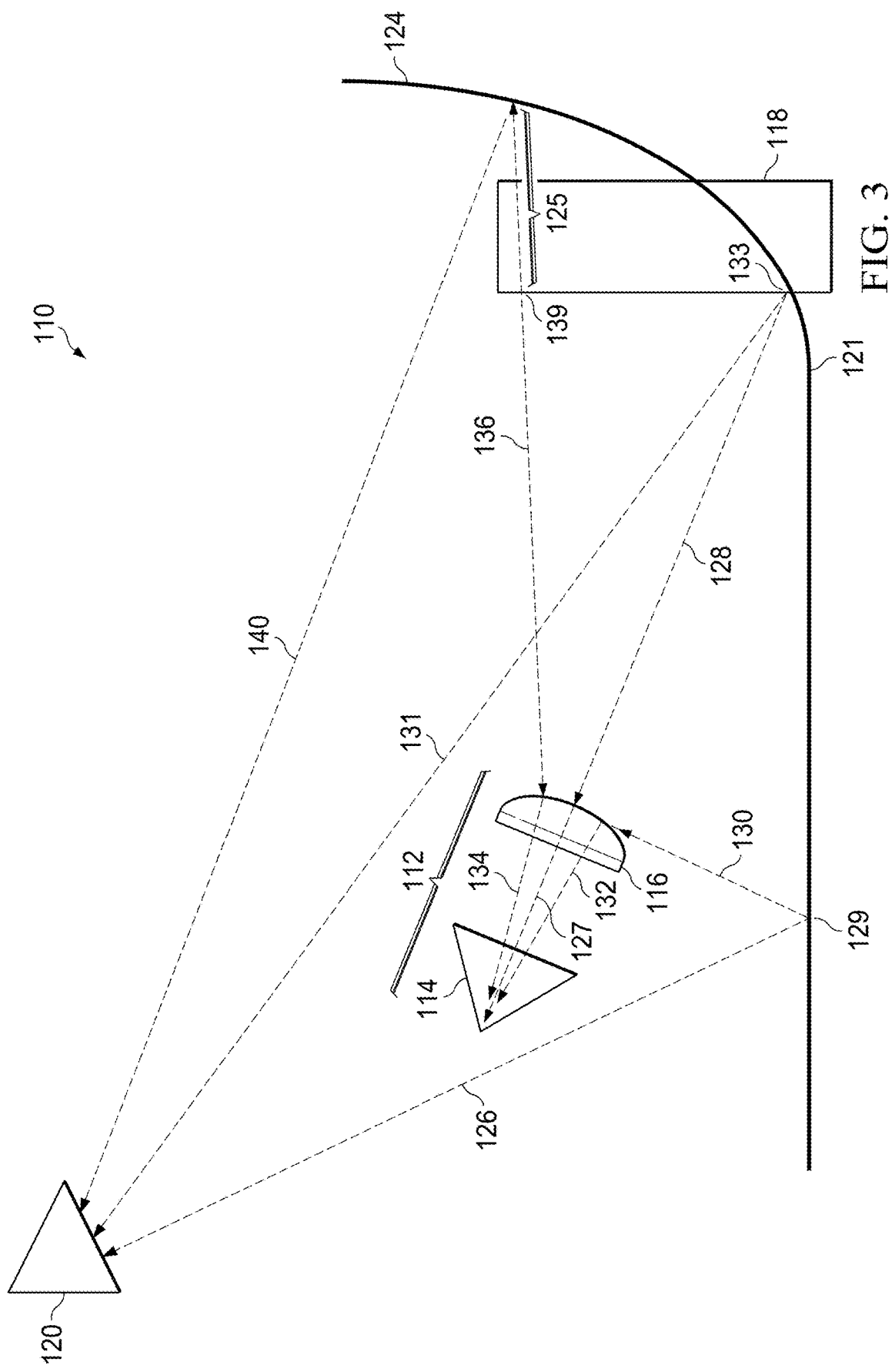
FIG. 3 illustrates an example conceptual diagram illustrating a bowl modulation process.

FIG. 3 illustrates a conceptual diagram 110 illustrating a bowl modulation process. A tall object 118 is in a field of view of a physical camera 112, one of multiple physical cameras for the conceptual diagram 110 (other physical cameras not pictured). The physical camera 112 contains a lens 116, which is a wide angle lens, and an image sensor 114, which is a video sensor, for example a complementary metal oxide semiconductor (CMOS) video sensor or a charge coupled device (CCD) image sensor. In the conceptual diagram 110, a virtual bowl surface 124 is used for rendering a scene. The depth of the virtual bowl surface 124 is defined as the distance between the origin of the physical cameras and the location where the elevation of the bowl surface starts, illustrated by point 121. The origin of the physical cameras is the centroid of the coordinates of the physical cameras of the conceptual diagram 110 projected to the ground.

The physical camera 112 images a point 139, high up on the tall object 118. When the virtual bowl surface 124 is used for rendering the scene, the point 139 is rendered along rays 136, 134, and 140, to a virtual camera 120. Because the point 139 is a distance 125 away from the virtual bowl surface 124, the point 139 is not accurately rendered using the virtual bowl surface 124. Additionally, a point 133, low on the tall object 118 and close to the virtual bowl surface 124, is rendered. When the virtual bowl surface 124 is used for rendering the scene, the point 133 is rendered along rays 127, 128, and 131. Because the point 133 is close to the virtual bowl surface 124, it is accurately rendered using the virtual bowl surface 124. Also, the physical camera 112 renders a point 129, close to the ground. When the virtual bowl surface 124 is used for rendering the scene, the point 129 is rendered along rays 132, 130, and 126. Because the point 129 lies close to the virtual bowl surface 124, it is accurately rendered using the virtual bowl surface 124.

Figure 4:
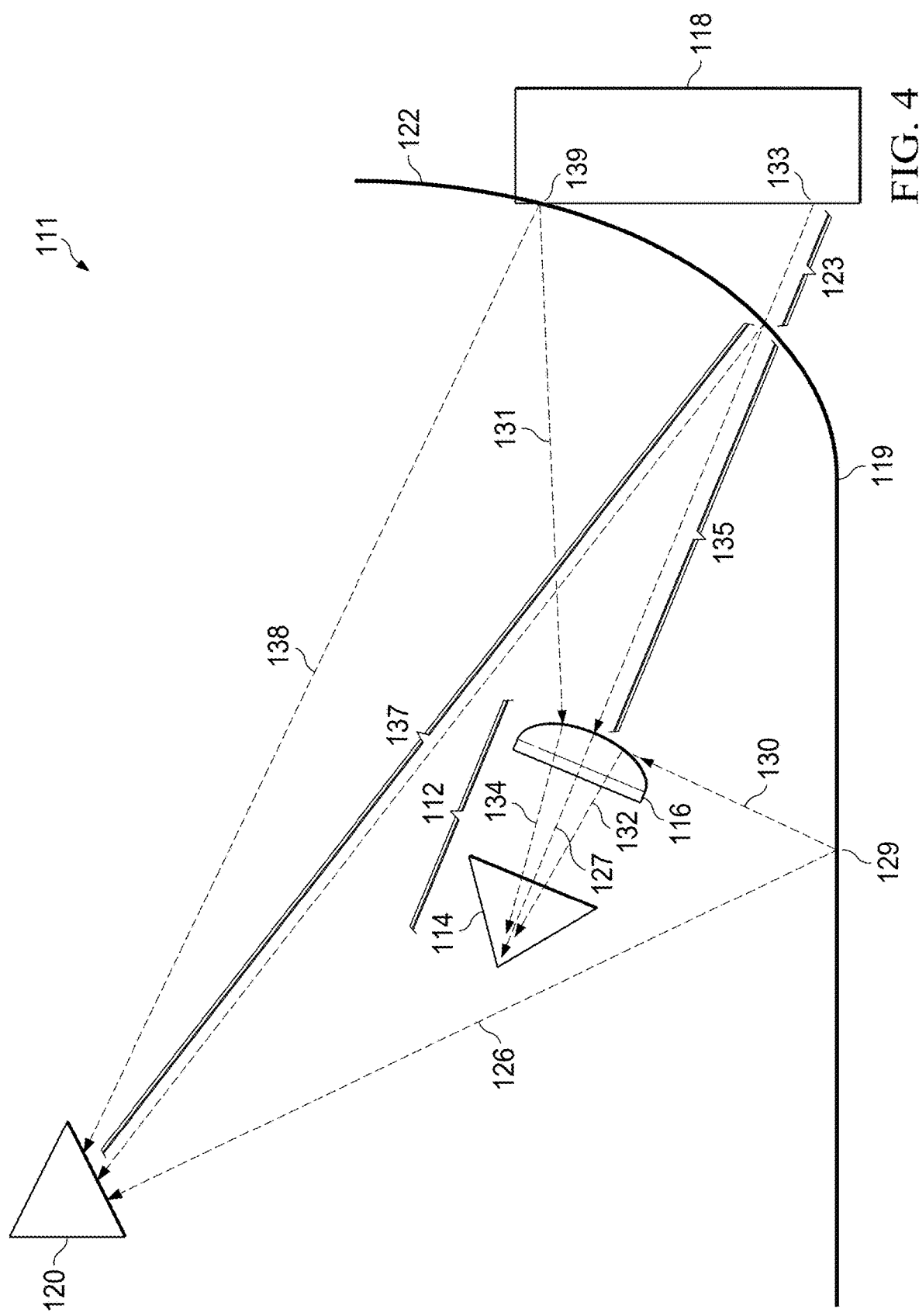
FIG. 4 illustrates an additional example conceptual diagram illustrating a bowl modulation process.

FIG. 4 illustrates a conceptual diagram 111 illustrating a bowl modulation process. The conceptual diagram 111 uses a virtual bowl surface 122 for rendering a scene. The depth of the virtual bowl surface 122 is the distance between the origin of the physical cameras and the location where the elevation of the bowl surface starts, illustrated by point 119. The origin is the centroid of the coordinates of the physical cameras projected to the ground.

Using the virtual bowl surface 122, the tall object 118 is more accurately rendered than using the virtual bowl surface 124 of FIG. 3, especially close to the point 139, because the point 139 is significantly closer to the virtual bowl surface 122 than to the virtual bowl surface 124. When the virtual bowl surface 122 is used for rendering the point 139, the point 139 is rendered along rays 131, 134, and 138. Because the virtual bowl surface 122 is close to the virtual bowl surface 124 at the point 129, the rendering of the point 129 is similar using the virtual bowl surface 122 and the virtual bowl surface 124. The point 133 is rendered less accurately using the virtual bowl surface 122 than using the virtual bowl surface 124, because the point 133 is closer to the virtual bowl surface 124 than to the virtual bowl surface 122. When the virtual bowl surface 122 is used for rendering the point 133, the point 133 is rendered along rays 135, 127, and 137. The point 133 is a distance 123 from the virtual bowl surface 122. Overall, the scene, especially the tall object 118, is rendered more accurately using the virtual bowl surface 122 than using the virtual bowl surface 124.

Figure 5:
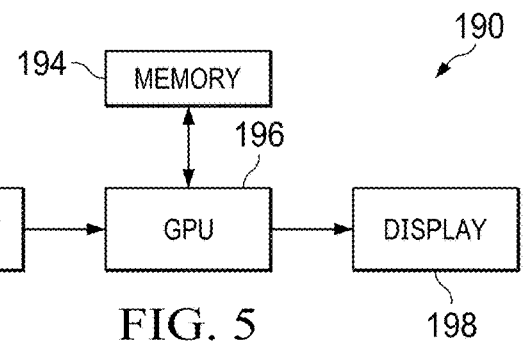
FIG. 5 illustrates an example system for surround view.

FIG. 5 illustrates a system 190 for surround view. The system 190 includes a GPU 196 coupled to physical cameras 192, to display 198, and to memory 194. The physical cameras 192 are multiple physical cameras, for example 4, 5, or 6 physical cameras. The physical cameras 192 may contain CMOS or CCD video sensors. Also, the physical cameras 192 have wide angle lenses, otherwise known as fish-eye lenses. The physical cameras 192 provide streams of image frames, known as streams of textures, to the GPU 196. There is some overlap between the streams of textures of adjacent cameras of the physical cameras 192. In an example, the physical cameras 192 are mounted on multiple sides of a vehicle. In one example, one physical camera is mounted on a front bumper of the vehicle, one physical camera is mounted on a rear bumper of the vehicle, and one physical camera is mounted on each side of the vehicle. In another example, for example when the vehicle is a truck, one physical camera is mounted on a front bumper of the vehicle, one physical camera is mounted on a rear bumper of the vehicle, and two physical cameras are mounted on each side of the vehicle.

The GPU 196 performs a physical camera to virtual camera transformation on textures of the stream of textures received from the physical cameras 192, by performing rasterization with texture mapping and applying a bowl to physical camera mapping. Another processor (not pictured), such as a DSP or an advanced reduced instructions set computing (RISC) machine (ARM), generates the virtual bowl surface and generates the bowl to physical camera mapping. The processor may generate the virtual bowl surface and the bowl to physical camera mapping offline. The bowl to physical camera mapping is stored in the memory 194, which may be volatile memory, such as random access memory (RAM). The GPU 196 retrieves the bowl to physical camera mapping from the memory 194 and applies the bowl to physical camera mapping to the textures of the stream of textures received from the physical cameras 192. The GPU 196 uses the virtual bowl surface as the input 3D geometry for rasterization. The GPU 196 uses the bowl to physical camera mapping in the rasterization, to perform physical camera to virtual camera transformation on the textures, generating an output image. The GPU 196 outputs the output image to the display 198.

Then, the display 198 displays the output image received from the GPU 196. The display 198 may be a liquid crystal display (LCD) or a light emitting diode (LED) display. In some examples, the display 198 is mounted inside the vehicle.

The system 190 may be implemented using standard GPU routines for rasterization. However, the system 190 may involve high cost, high power, and/or high thermal dissipation devices.

Figure 6:
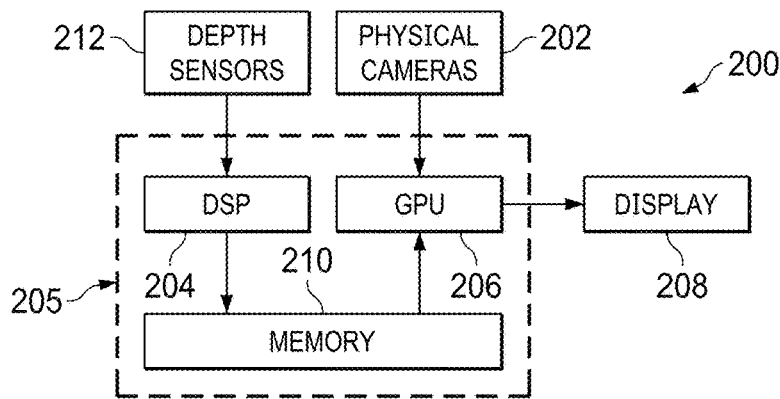
FIG. 6 illustrates an additional example system for surround view.

FIG. 6 illustrates a system 200 for surround view. The system 200 includes an SoC 205, for example a TDA2x™ processing chip, a TDA2p™ processing chip, or a J7TDA4x™ processing chip, made by Texas Instruments. The SoC 205 contains a DSP 204, a GPU 206, and memory 210. The SoC 205 is coupled to depth sensors 212, to physical cameras 202, and to a display 208. The system 200 performs surround view using the GPU 206 and the DSP 204. In an example, the system 200 performs adaptive physical camera to bowl mapping on the DSP 204 with low loading. In an example, the DSP 204 is a C66x™ DSP, made by Texas Instruments.

The depth sensors 212 send streams of depth measurements to the DSP 204, which may indicate the distance between objects and the depth sensors 212. The depth sensors 212 may be mounted on a vehicle. The depth sensors 212 may be ultrasonic sensors, radar sensors, LIDAR sensors, time-of-flight (ToF) cameras, stereo vision sensors, or structure from motion (SFM) sensors.

The DSP 204 receives streams of received depth measurements from the depth sensors 212. The DSP 204 may discard depth measurements of the streams of depth measurements corresponding to objects having sizes below an object size threshold, and retain the depth measurements of the streams of depth measurements corresponding to objects having sizes above the object size threshold. The DSP 204 may scale the streams of received depth measurements from the depth sensors 212, converting the depth measurements to grid size using a scaling factor, to generate streams of corrected depth measurements, indicating the distance between the objects and the origin of the physical cameras 202. The scaling factor depends on the locations of the physical cameras, for example the separation between the physical cameras. The origin is the centroid of the physical cameras 202 projected to the ground. In an example, the DSP 204 generates a virtual bowl surface and a bowl to physical camera mapping from coordinates of the virtual bowl surface to coordinates of the physical cameras 202. In an example, one depth sensor corresponds to each physical camera, and a physical camera and the corresponding depth sensor have a similar point of view. In other examples, there are more physical cameras than depth sensors, or more depth sensors than physical cameras.

The DSP 204 detects events, for example significant changes in the scene captured by one or more of the physical cameras 202, based on the streams of received depth measurements or based on the streams of corrected depth measurements. The DSP 204 may detect an event when the difference between the depth of the flagged object and the depth of predominant object variable is greater than a threshold depth difference. The DSP 204 determines a depth of a flagged object in each direction based on the streams of received depth measurements or the streams of corrected depth measurements in the corresponding direction. The flagged object in a direction may correspond to the largest object, the closest object, or an object otherwise determined to be the flagged object based on a combination of size and distance in the direction. A depth of predominant object variable indicates the depth of a previously flagged object.

In response to detecting an event, the DSP 204 updates the depth of predominant object variable in each direction based on the depth of the flagged object in the corresponding direction. In an example, the DSP 204 sets the depth of the predominant object variable to be the depth of the flagged object.

In response to detecting an event, the DSP 204 also generates an updated virtual bowl surface based on the depth of the flagged object and/or based on a previous virtual bowl surface. The DSP 204 may retrieve information regarding the calibration of the depth sensors 212 and the physical cameras 202 from the memory 210. The DSP 204 may use this information on the calibration of the depth sensors 212 and the physical cameras 202 to generate an updated virtual bowl surface. Also, the DSP 204 generates a bowl to physical camera mapping for the updated virtual bowl surface, which may be in the form of a look up table (LUT). The updated virtual bowl surface and the bowl to physical camera mapping may be stored as a collection of vertices, for example a mesh table. The mesh table includes three dimensional (3D) world coordinates for locations surrounding the system 200. The virtual bowl surface may be an arbitrary shape. In one example, the virtual bowl surface is a boxed quadrilateral including five planes. One plane lies along the ground, and the other four planes form sloped sides of the box. The depth of the virtual bowl surface in each direction is the distance between the location where the sloped sides meet the ground and the origin of the physical cameras. Curved regions may connect the five planes. Values in the LUT may indicate, for each vertex of the virtual bowl surface, coordinates of the physical cameras that are mapped to that vertex. In an example, the coordinates are integer coordinates indicating a single pixel. In another example, in regions of physical camera overlap, the coordinates include a blending LUT, which encodes weights for a linear combination of image intensity information received at each physical camera location from adjacent cameras. In an example, the LUT is stored in binary form.

The DSP 204 stores the mesh table, including the virtual bowl surface and the bowl to physical camera mapping, in the memory 210, for use by the GPU 206. The memory 210 may be dynamic memory, such as synchronous dynamic random access memory (SDRAM). In one example, the memory 210 is a non-transitory computer readable storage medium storing a program for execution by the DSP 204 and/or for execution by the GPU 206, where the program includes instructions. In some examples, the memory 210 includes multiple memory types, for example multiple types of volatile memory and/or non-volatile memory.

The physical cameras 202 are multiple physical cameras pointing in different directions. There is some overlap between the fields of view of adjacent cameras of the physical cameras 202. The physical cameras 202 may be four or six physical cameras mounted on a vehicle. In one example, one physical camera is mounted on the front bumper of the vehicle, one physical camera is mounted on the rear bumper of the vehicle, and one physical camera is mounted on each side of the vehicle. In another example, one physical camera is mounted on the front bumper of the vehicle, one physical camera is mounted on the rear bumper of the vehicle, and two physical cameras are mounted on each side of the vehicle. The physical cameras 202 have wide angle lenses, otherwise known as fish-eye lenses. Additionally, the physical cameras 202 have video sensors, for example CCD or CMOS video sensors. The physical cameras 202 provide streams of image frames, known as streams of textures, to the GPU 206.

The GPU 206 is coupled to the physical cameras 202, and also to the memory 210. The GPU 206 receives textures of the streams of textures from the physical cameras 202. Also, the GPU 206 retrieves the mesh table, including the virtual bowl surface and the bowl to physical camera mapping, from the memory 210. The GPU 206 reads the mesh table as a set of vertex coordinates and a mapping from the vertex coordinates to the physical camera coordinates for one or two of the physical cameras 202. When two physical cameras are mapped to a point, the mesh table also includes a blending table, indicating the relative weights that the GPU 206 applies to the texture values from the two physical cameras. The GPU 206 performs rasterization by transforming the textures received from the physical cameras 202 using the bowl to physical camera mapping, to generate an output image in virtual camera coordinates. The GPU 206 then outputs the output image to the display 208. The GPU 206 may store the output image in the memory 210.

The display 208 displays the output image. The display 208 may be an LED display, an LCD display, or another display type. The display 208 may be in the cabin of a vehicle, in view of a driver and/or in view of the passengers. In some examples, the output image is transmitted to a remote location using wired or wireless communications.

Figure 7:
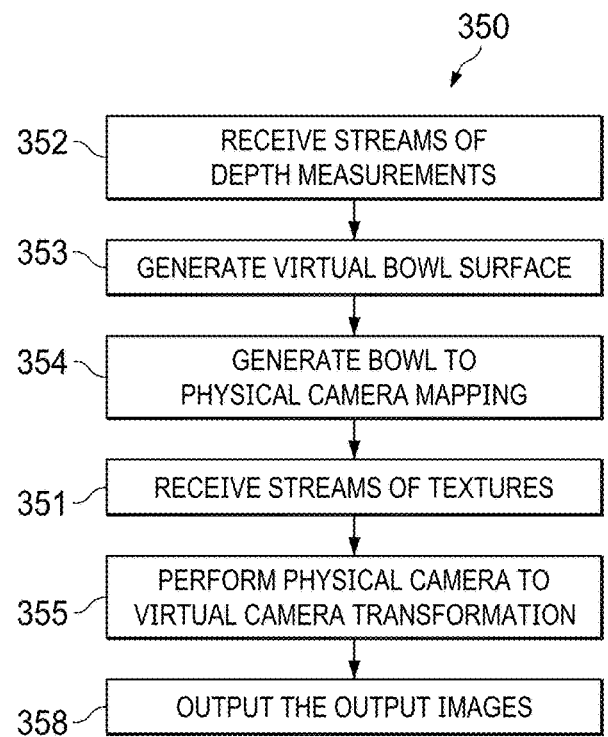
FIG. 7 illustrates a flowchart for an example method of surround view.

FIG. 7 illustrates a flowchart 350 for an example method of surround view. In an example, the method performed by the flowchart 350 is performed by an SoC, such as the SoC 205 illustrated by FIG. 6.

In a block 352, the SoC receives streams of depth measurements, as streams of received depth measurements, from depth sensors. In one example, a processor of the SoC, such as a DSP, for example the DSP 204 illustrated by FIG. 6, performs the block 352. In one example, the processor receives streams of received depth measurements from four depth sensors mounted on a vehicle. In another example, the processor receives streams of received depth measurements from more depth sensors, for example from six depth sensors. The processor may generate, based on the streams of received depth measurements, by converting the depth measurements of the streams of received depth measurements to grid size using a scaling factor, streams of corrected depth measurements, indicating the distances between objects and the origin.

In a block 353, the SoC generates a virtual bowl surface, known as an updated virtual bowl surface, based on the streams of received depth measurements or based on the streams of corrected depth measurements. In an example, a processor of the SoC, for example a DSP, performs the block 353. The processor determines a flagged object based on the streams of received depth measurements or the streams of corrected depth measurements. In an example, the processor updates the depth of predominant object variable to be the depth of the flagged object. The processor may generate the updated virtual bowl surface based on the depth of the flagged object. The processor may consider characteristics of the depth sensors and of the physical cameras in generating the updated virtual bowl surface. The processor may store the updated virtual bowl surface in memory, for example as a list of vertices indicating a height as a function of the corresponding ground coordinates.

In a block 354, the SoC generates a bowl to physical camera mapping based on the updated virtual bowl surface generated in the block 353. In an example, a processor of the SoC, such as a DSP, performs the block 354. The processor generates the bowl to physical camera mapping from the bowl surface $(x_1, y_1, z_1)$ to the physical camera coordinates $(x_2, y_2)$, by determining the physical camera coordinates $(x_2, y_2)$ corresponding to the virtual bowl surface coordinates $(x_1, y_1, z_1)$. The processor generates this bowl to physical camera mapping for two physical cameras per vertex in overlapping regions, and for one physical camera per virtual bowl surface vertex in non-overlapping regions. The processor stores the bowl to physical camera mapping in memory. The bowl to physical camera mapping may be stored in a LUT. The LUT and the virtual bowl surface may collectively be referred to as a mesh table. In an example, the processor generates a mesh table in response to detecting an event. In another example, the processor generates the mesh table for every frame. The processor stores the LUT as a projection table from the three dimensional virtual bowl surface coordinates to the two dimensional camera coordinates. The processor may store the LUT as binary files in a non-volatile memory, such as a secure digital card (sdcard). The LUT contains entries for each physical camera view point in the table.

In a block 351, a processor of the SoC, for example a GPU, such as the GPU 206 in FIG. 6, receives streams of textures from the physical cameras, from another processor, such as an image signal processor (ISP), or from memory. In an example, the processor receives a first stream of textures originating from a first physical camera in a first direction and receives a second stream of textures originating from a second physical camera in a second direction. The streams of textures may be received by the processor from multiple cameras, for example by four or six physical cameras mounted on a vehicle. There may be the same number of physical cameras and depth sensors, more physical cameras than depth sensors, or more depth sensors than physical cameras.

In a block 355, a processor of the SoC, such as a GPU, performs a physical camera to virtual camera transformation of the textures of the streams of textures, to generate output images. The processor retrieves the bowl to physical camera mapping from memory. The processor performs the physical camera to virtual camera transformation by performing rasterization and applying the bowl to physical camera mapping, generating output images. In an example, the processor applies the LUT in applying the bowl to physical camera mapping. The physical camera coordinate values of the LUT are functions of the virtual bowl surface coordinates $(x_1, y_1, z_1)$. The virtual bowl surface coordinates, $(x_1, y_1, $ and $z_1)$, are the inputs to the LUT, and the outputs of the LUT are the coordinates of the physical camera, $(x_2, y_2)$, corresponding to the virtual bowl surface coordinates. For example, the physical camera coordinate values are determined by applying the LUT to the virtual bowl surface coordinates by implementing:

$$(x_2, y_2) = LUT(K[R|T][x_1 y_1 z_1 1]')$$

where K is a 3×3 intrinsic camera parameter matrix representing a focal length of the camera lens, R| T is a 3×4 matrix indicating a pose of the physical camera, where R is rotation of the physical camera along the origin, and T is translation of the physical camera, and $(x_1, y_1, z_1)$ are the coordinates of the virtual bowl surface.

In a block 358, a processor outputs the output images. For example, the processor outputs the output images to a display in the cabin of the vehicle, to be visible to the driver of the vehicle and/or to a passenger of the vehicle. In some examples, the processor sends the output image to be remotely viewed, over a wired or wireless network.

Figure 8:
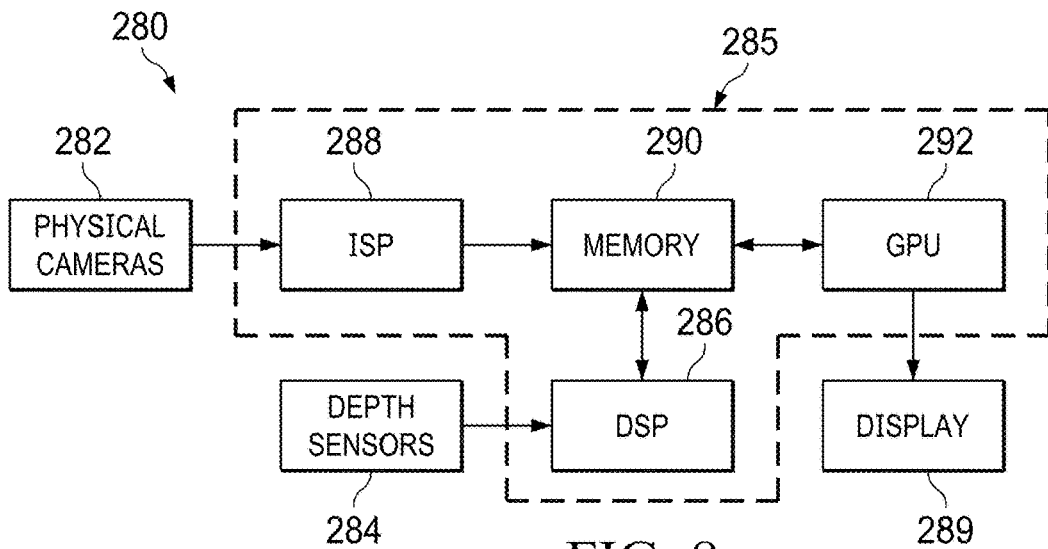
FIG. 8 illustrates another example system for surround view.

FIG. 8 illustrates a system 280 for surround view. The system 280 includes an SoC 285, such as a TDA2x™ processing chip, a TDA2p™ processing chip, or a TDA4x™ processing chip, made by Texas Instruments. The SoC 285 includes an ISP 288, memory 290, a GPU 292, and a DSP 286. The SoC 285 is coupled to physical cameras 282, to depth sensors 284, and to a display 289. The physical cameras 282 are mounted on a vehicle. In one example, one physical camera is mounted on each side of a vehicle. In some examples, multiple physical cameras are mounted on at least one side of the vehicle. For example, a truck may have multiple physical cameras on each side. The physical cameras 282 each have wide angle lenses and a video sensor, for example a CCD sensor or a CMOS sensor. In one example, the video sensors are 1920×1080 pixel sensors. The physical cameras 282 generate streams of image frames, known as streams of textures. Adjacent physical cameras of the physical cameras 282 have overlapping fields of view.

The ISP 288 receives the streams of textures, for example as streams of input textures, from the physical cameras 282. The ISP 288, which is a specialized DSP, performs processing on the streams of input textures, to generate streams of processed textures. The ISP 288 may perform Bayer transformation, noise reduction, and/or image sharpening on the streams of input textures. In Bayer transformation, the ISP 288 determines RGB values for each pixel based on the values from single color pixels. In noise reduction, the ISP 288 filters out noise. In image sharpening, the ISP sharpens edges and contour using edge detection. Image sharpening may compensate for edge sharpness that has been removed by the noise reduction filtering. The ISP stores the streams of processed textures in the memory 290. The memory 290 may be a volatile memory, for example SDRAM, or a non-volatile memory. In some examples, the ISP directly sends the streams of processed textures to the GPU 292. In some examples, the ISP 288 is not present in the SoC 285.

The depth sensors 284 are multiple depth sensors, which may be four, five, or six depth sensors mounted on a vehicle. The depth sensors 284 generate streams of depth measurements. In an example, there is one depth sensor close to each physical camera, so the physical camera has a similar point of view to the corresponding depth sensor.

In one example, the depth sensors 284 are ultrasonic sensors. Ultrasonic sensors transmit an ultrasonic signal and receive an echo signal of the transmitted ultrasonic signal. The ultrasonic sensors determine the distance to the object based on the echo signal. The ultrasonic sensors may be tuned to discard echo signals from objects having sizes less than an object size threshold, where the ultrasonic sensor does not detect objects having sizes greater than or equal to the object size threshold, and does detect objects larger than the object size threshold.

In another example, the depth sensors 284 are radar sensors, for example frequency modulated continuous wave (FMCW) radar sensors. For FMCW radar sensors, transmitters of the FMCW radar sensors continuously transmits a frequency-modulated millimeter wave signal, with the frequency increasing with time in a chirp. Objects reflect the chirp, and antennas of the FMCW radar sensors receive the reflection. The FMCW radar sensors perform a range fast-Fourier transforms (FFTs) on the chirp peaks, to obtain distances of the objects. Small range values, for example below a threshold, may indicate small objects, and may be discarded by the FMCW radar sensors.

In an additional example, the depth sensors 284 are LIDAR sensors. In LIDAR, an object is illuminated with pulsed laser light, and the reflections from objects are sensed by sensors. Differences in the return times and wavelengths are used by the LIDAR sensors to obtain three dimensional representations of the objects. LIDAR may be scanned or scannerless. An example scannerless LIDAR, a ToF camera, resolves distance based on the speed of light.

In another example, the depth sensors 284 are camera based depth sensors, such as stereo vision sensors or structure from motion (SFM) sensors. With stereo vision sensors, two or more two dimensional video cameras obtain three dimensional information. In SFM sensors, the SFM sensors estimate three dimensional structures from two dimensional image sequences, which may be coupled with local motion signals. For example, SFM sensors track corner features from one image to the next. The SFM sensors track features from one image to the next, for example using a Lukas-Kanade tracker. The SFM sensors filter feature matches, for example using random sample consensus (RANSAC), to remove outlier correspondences. In some examples, the SFM sensors directly estimate geometric information from the images.

In an example, the DSP 286 performs a coordinate transformation, to translate a coordinate system of the depth sensors 284 to a coordinate system of the physical cameras 282. This calibration and coordinate transformations accounts for physical separation of the physical cameras 282 and the depth sensors 284. In an example, the physical cameras are placed on the outer surface of the vehicle, while the depth sensors 284 are placed on the roof of the vehicle or embedded in the vehicle.

The DSP 286 receives streams of received depth measurements from the depth sensors 284. The DSP 286 may determine streams of corrected depth measurements based on the streams of received depth measurements, converting the depth measurements to grid size using a scaling factor, scaled to indicate the distance between the objects and the origin. The DSP 286 may use filtering to smooth the streams of received depth measurements.

The DSP 286 detects events, including performing thresholding, generates a virtual bowl surface, and generates a bowl to physical camera mapping based on the streams of received depth measurements. To detect events, the DSP 286 detects flagged objects, including newly appearing objects and disappearing objects, and determines depths of flagged objects based on the streams of received depth measurements or the streams of corrected depth measurements. A depth of predominant object variable indicates a depth of a previous flagged object. The DSP 286 detects an event when the difference between the depth of the flagged object and the predominant object variable is greater than the threshold depth difference. The DSP 286 updates the predominant object variable in response to detecting the event. In an example, the DSP 286 sets the depth of the predominant object variable to be the depth of the flagged object. In response to detecting an event, the DSP 286 also generates a mesh table, including fully or partially updated virtual bowl surface vertices and a bowl to physical camera mapping between the vertices and the physical camera coordinates. The DSP 286 stores the mesh table in the memory 290. Also, the DSP 286 stores the bowl to physical camera mapping, in the form of a LUT, in the memory 290. The LUT indicates, for each vertex on the virtual bowl, the corresponding coordinates on each physical camera. The LUT may also contain blending tables indicating the relative weights given to the physical cameras 282. The DSP 286 also stores the virtual bowl surface vertices in the memory 290.

The GPU 292 receives the textures of the stream of textures or the stream of processed textures from the memory 290, from the physical cameras 282, or from the ISP 288. The GPU 292 performs physical camera to virtual camera transformation on the textures, to generate an output image. In an example, the GPU 292 reads a mesh table containing the virtual bowl surface vertices and the bowl to physical camera mapping from the memory 290. In an example, the physical camera coordinate values $(x_2, y_2)$ of the LUT are functions of the virtual bowl surface coordinates $(x_1, y_1, z_1)$. The virtual bowl surface coordinates, $(x_1, y_1, \text{and } z_1)$, are the inputs, and the outputs are the coordinates of the physical camera, $(x_2, y_2)$, corresponding to the virtual bowl surface coordinates. For example, the physical camera coordinate values corresponding to virtual bowl surface coordinates are determined by using the virtual bowl surface coordinates as the inputs to the LUT by implementing:

$$(x_2, y_2) = \text{LUT}(K[T|T][x_1 y_1 z_1 1]')$$

where K is a 3×3 intrinsic camera parameter matrix representing a focal length of the camera lens, RI T is a 3×4 matrix indicating a pose of the physical camera, where R is rotation of the physical camera along the origin, and T is translation of the physical camera, and $(x_1, y_1, z_1)$ are the coordinates of the virtual bowl surface. The output of the LUT is the physical camera coordinates of one or two physical cameras that correspond to a vertex. The GPU 292 performs the physical camera to virtual camera transformation on the textures, using the bowl to physical camera mapping, generating the output image. Accordingly, each virtual camera location of the output image has an appropriate pixel value for display. The GPU 292 outputs the output image to the display 289. Also, the GPU 292 may store the output image in the memory 290.

The display 289 displays the output image to a user. For example, the display 289 is an LED or LCD display visible to the driver of the vehicle. In some examples, the display 289 is visible to passengers in the vehicle.

Figure 9:
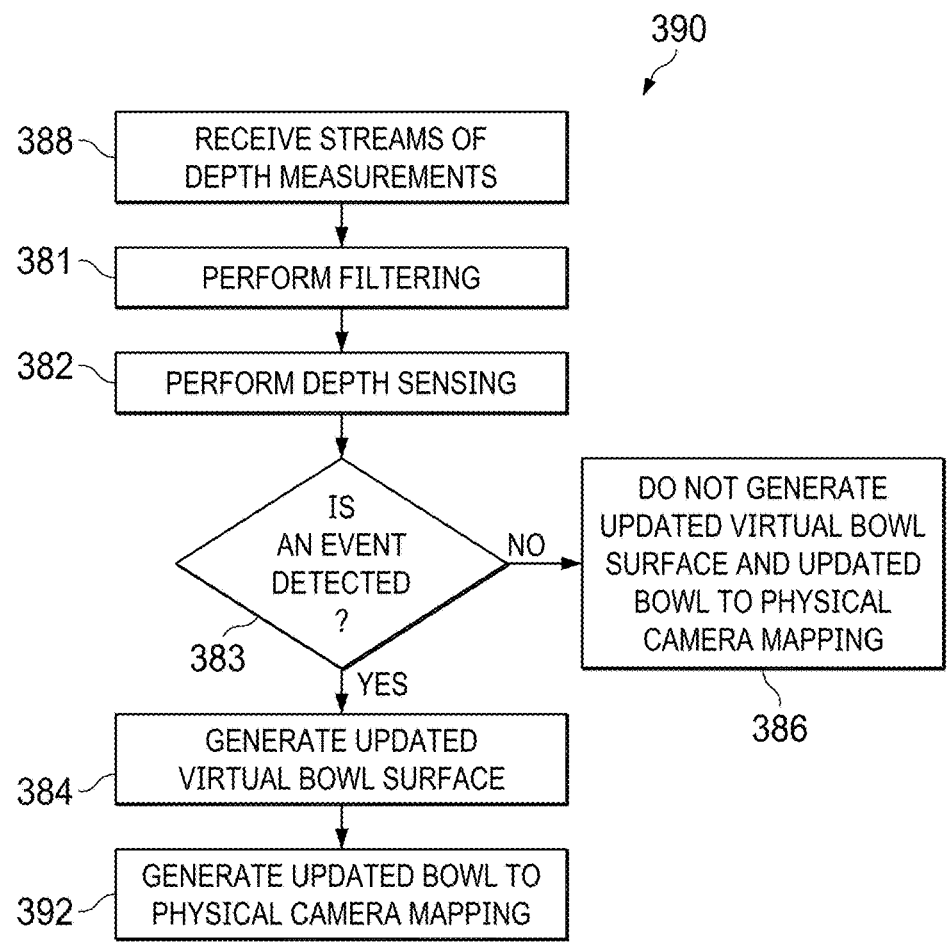
FIG. 9 illustrates an additional flowchart for an example method of surround view.

FIG. 9 illustrates a flowchart 390 for an example method of surround view performed by a processor, such as a DSP, for example a C66x™ DSP, made by Texas Instruments. In an example, the DSP is a part of an SoC. For example, the DSP may be the DSP 286 of the SoC 285 illustrated by FIG. 8 or the DSP 204 of the SoC 205 illustrated by FIG. 6. In a block 388, the processor receives streams of depth measurements, as streams of received depth measurements, from depth sensors. The processor may receive streams of received depth measurements from multiple depth sensors in multiple directions, for example from multiple ultrasonic sensors, multiple FMCW radar sensors, multiple LIDAR sensors, or multiple physical camera based depth sensors, such as stereo vision sensors or SFM sensors. In one example, the depth sensors are tuned to discard depth measurements generated by small objects by discarding depth measurements corresponding to objects having sizes less than an object size threshold. The processor may scale the streams received depth measurements, to generate streams of corrected depth measurements, indicating the distance between objects and the origin.

Figure 10A:
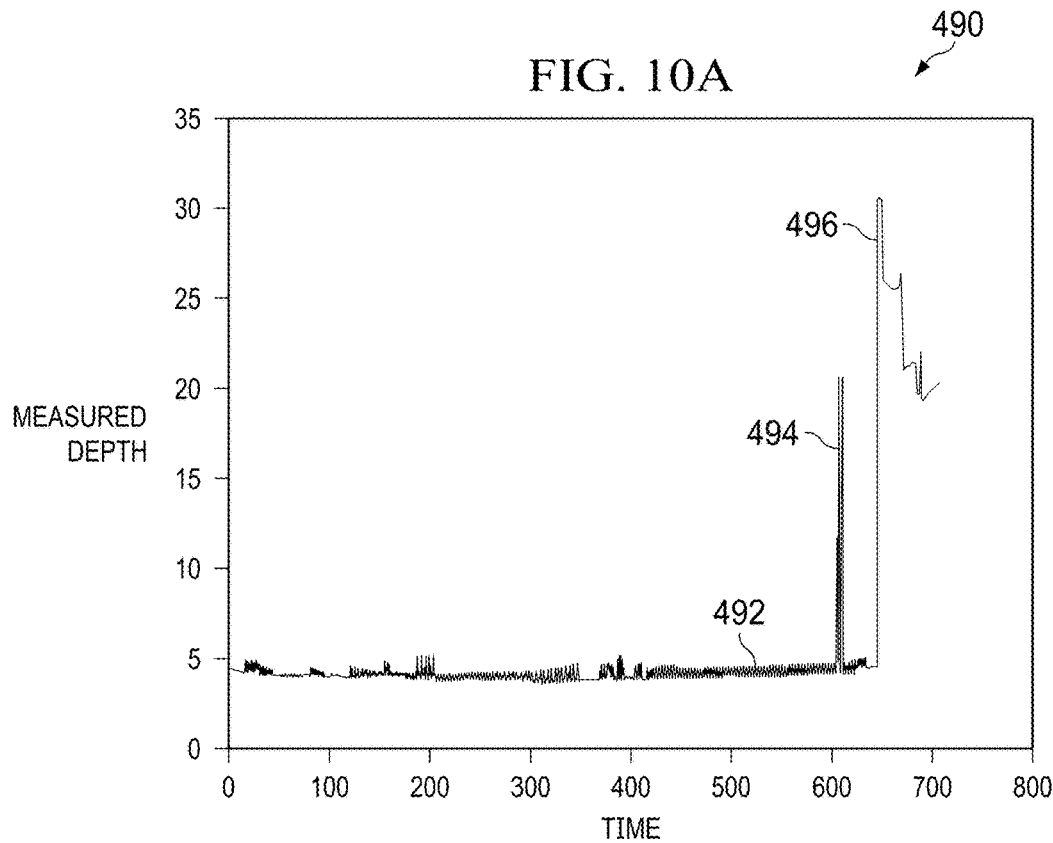
FIGS. 10A-B illustrate graphs of streams of depth measurements over time with and without median filtering.
Figure 10B:
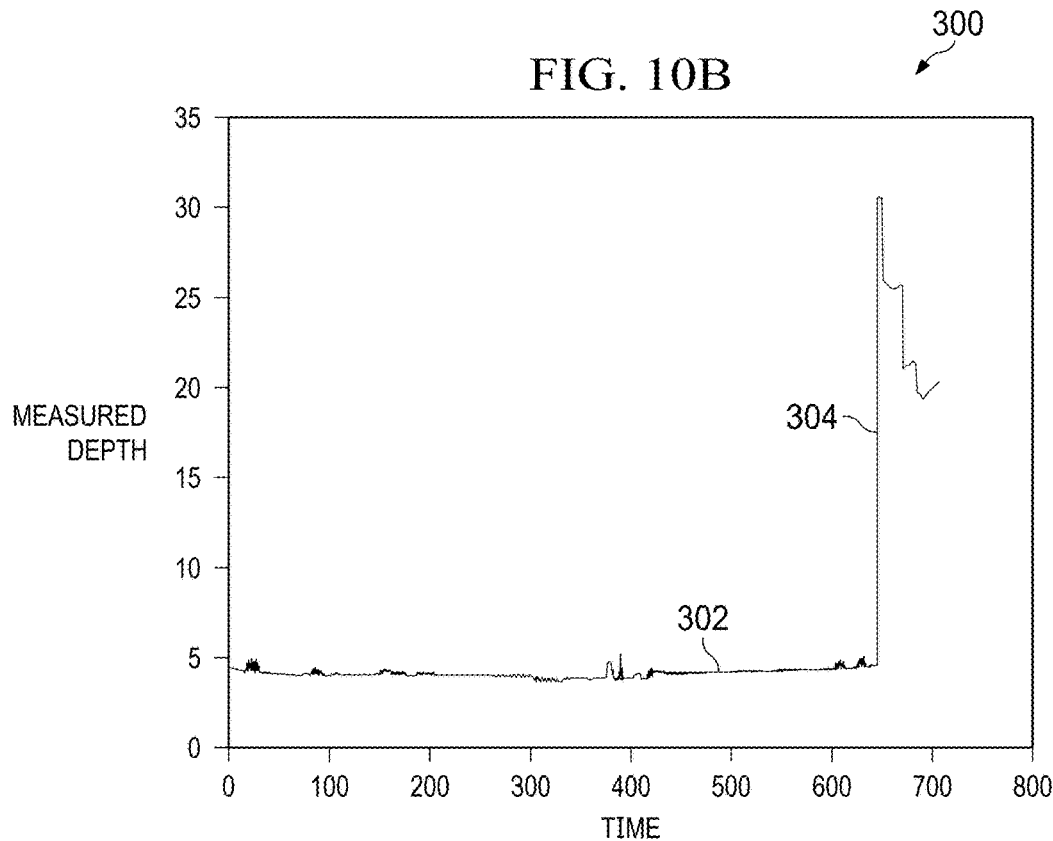
Figure 11:
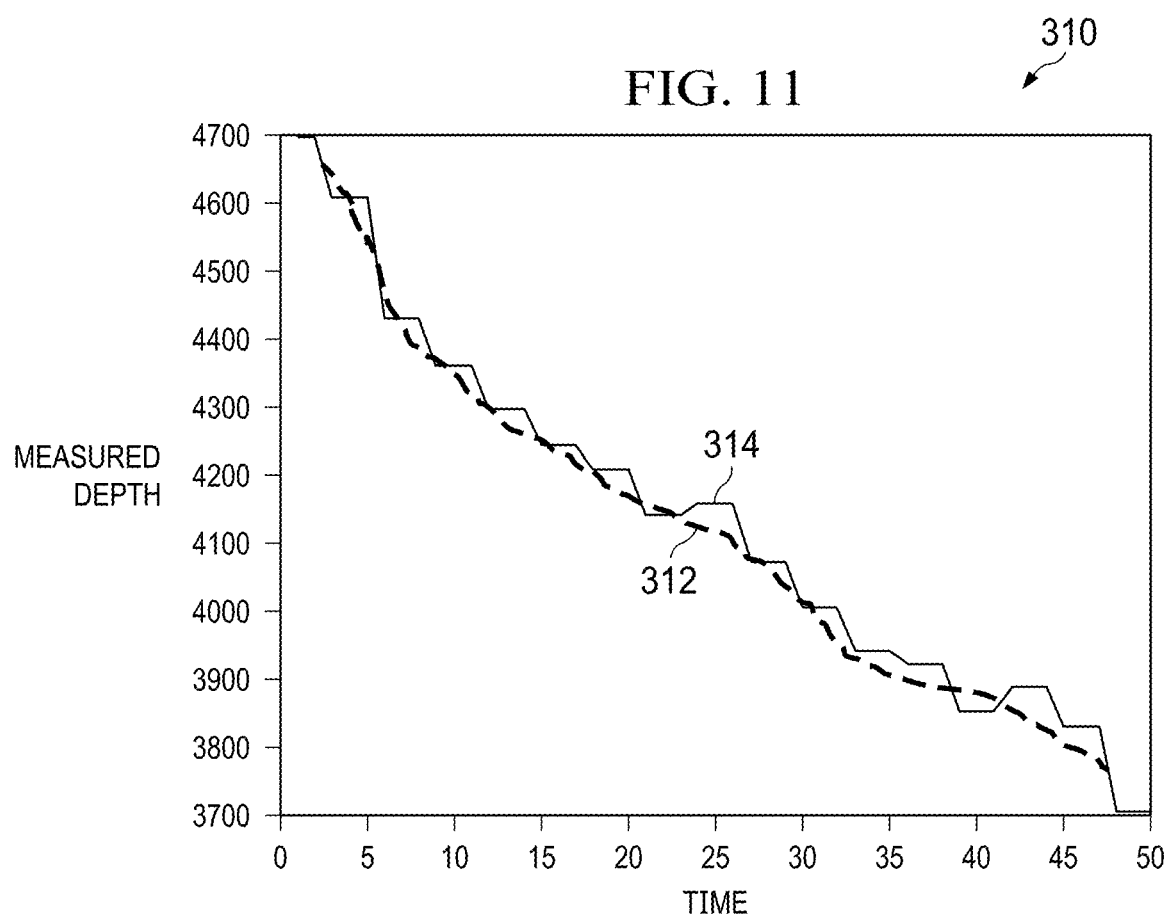
FIG. 11 illustrates a graph of streams of depth measurements over time with and without lowpass filtering.

In a block 381, the processor performs filtering on the streams of received depth measurements from the block 388 or on the streams of corrected depth measurements, to generate streams of filtered depth measurements. In an example, the processor uses an N tap median filter, for example a 5 tap median filter, to remove spurious detections, while retaining features. In median filtering, the processor replaces each pixel with the median of neighboring pixels in a window. FIGS. 10A-B illustrate streams of depth measurements before and after median filtering. FIG. 10A illustrates a graph 490, with a curve 492 plotting a stream of depth measurements over time, before median filtering. A spike 494 illustrates a false depth, while a feature 496 indicates an object. FIG. 10B illustrates a graph 300, with a curve 302, plotting a stream of depth measurements over time after median filtering. The curve 302 is smoothed, and the false depth has been removed. A feature 304, indicating an object, is retained. In another example, the processor uses a Kalman filter. In a prediction step of the Kalman filter, the processor produces estimates of current state variables, along with corresponding uncertainties. Then, the processor updates the estimates using a weighted average, with more weight given to estimates with higher certainty. The processor runs the Kalman filter in real time. The processor may also run a low pass filter on the streams of depth measurement to smooth the data. A low pass filter passes signals having frequencies below a cutoff frequency and attenuates signals with frequencies above the cutoff frequency. FIG. 11 illustrates a graph 310, with a curve 314 plotting a stream of depth measurements over time before low pass filtering, and a curve 312 plotting a stream depth measurement over time after low pass filtering. The low pass filter removes noise from the stream of depth measurements. In an example, the processor performs multiple filtering steps. In some examples, the block 381 is not performed.

In a block 382, the processor performs depth sensing based on the streams of filtered depth measurements, the streams of corrected depth measurements, or the streams of received depth measurements. The processor determines a flagged object in each direction, based on the stream of filtered depth measurements, the steam of corrected depth measurements, or the stream of received depth measurements. The flagged object indicates an object producing the largest signal based on the sensor output, which may indicate the largest object, the object closest to the surround view system, or an otherwise important object, for example an object that is flagged based on a combination of size and proximity. The processor may use both the object size and object range to determine the flagged object. In one example, the depth of the flagged object is the depth a relatively small object very close to the depth sensor. In another example, the depth of the flagged object is the depth of a larger object moderately far from the depth sensor.

In a block 383, the processor determines whether an event is detected based on the depth of the flagged object. The processor detects an event when the difference between the depth of the flagged object and the depth of predominant object variable is greater than a threshold depth difference in that direction. In an example, the processor retrieves the depth of predominant object variables from memory. The predominant object variable indicates the depth of a previous flagged object. The processor compares the depth of the flagged object in each direction to the depth of predominant object variable in each direction. When the difference between the depth of the flagged object and the depth of predominant object variable in a direction is greater than a threshold depth difference, the processor detects an event, for example by setting a flag to a first value, for example 1. Also, in response to detecting an event, the processor updates the depth of predominant object variable to be the depth of the flagged object in the direction in which the processor detects an event. On the other hand, when the difference between the depth of the flagged object and the depth of predominant object variable in each direction is less than the threshold depth difference in all directions, the processor does not detect an event. In one example, the processor sets the flag to a second value, for example 0, when it does not detect an event. Also, when the processor does not detect an event, the processor retains the depth of predominant object variable for each direction. The use of a threshold depth difference in event detection may reduce oscillations and jitteriness in the virtual bowl modulation, for a smooth transition between virtual bowl surfaces. Also, the use of the threshold depth difference reduces the processing overhead in the processor by only generating an updated virtual bowl surface for significant events. In an example, the processor detects an event approximately one in five frames. When the processor detects an event, the processor proceeds to a block 384. On the other hand, when the processor does not detect an event, the processor proceeds to a block 386, and does not generate an updated virtual bowl surface and an updated bowl to physical camera mapping.

In a block 384, the processor generates an updated virtual bowl surface based on the event detected in the block 383 and/or based on a previous virtual bowl surface. In an example, the updated virtual bowl surface has a similar shape to the previous virtual bowl surface, but with an updated depth, and the updated depth is determined based on the depth of the flagged object. In one example, the updated depth is equal to the depth of the flagged object. In another example, the updated depth is an offset from the depth of the flagged object.

In an example, the processor updates the vertices of the virtual bowl surface in a series of intermediate steps, to avoid a sudden jump in the virtual bowl surface. For example, the processor generates a sequence of n virtual bowl surface over n steps, where n, the number of steps, is an integer greater than 1. For example, n may be 2, 3, 4, 5, 6, or another integer greater than 1. The processor determines the depth of the $n^{th}$ updated virtual bowl surface, $D_n$ (i.e., the depth of the updated virtual bowl surface for the final step) based on the depth of the flagged object. Do is the depth of the previous virtual bowl surface before any steps. The processor sets the depth of an updated virtual bowl surface for an $s^{th}$ step of the n steps, $D^s$, as a function of s, n, $D_n$, and $D_0$. For example, the processor sets the depth $D^s$ for the $s^{th}$ step to be:

$$D^s = \frac{s(D_n - D_0)}{n} + D_0,$$

where s is the step number, ranging from 1 to n. The processor generates a depth value for each vertex point as a function of the ground coordinates (x, y).

Figure 12:
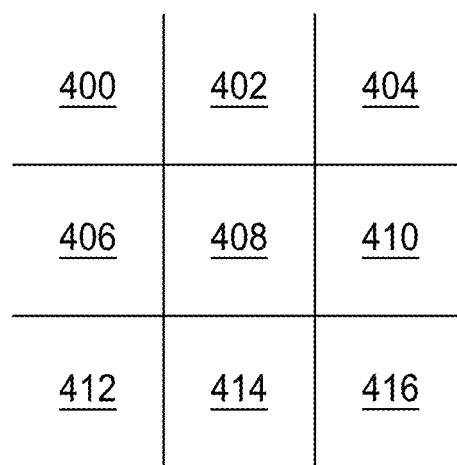
FIG. 12 illustrates example virtual bowl surface segments.
Figure 13A:
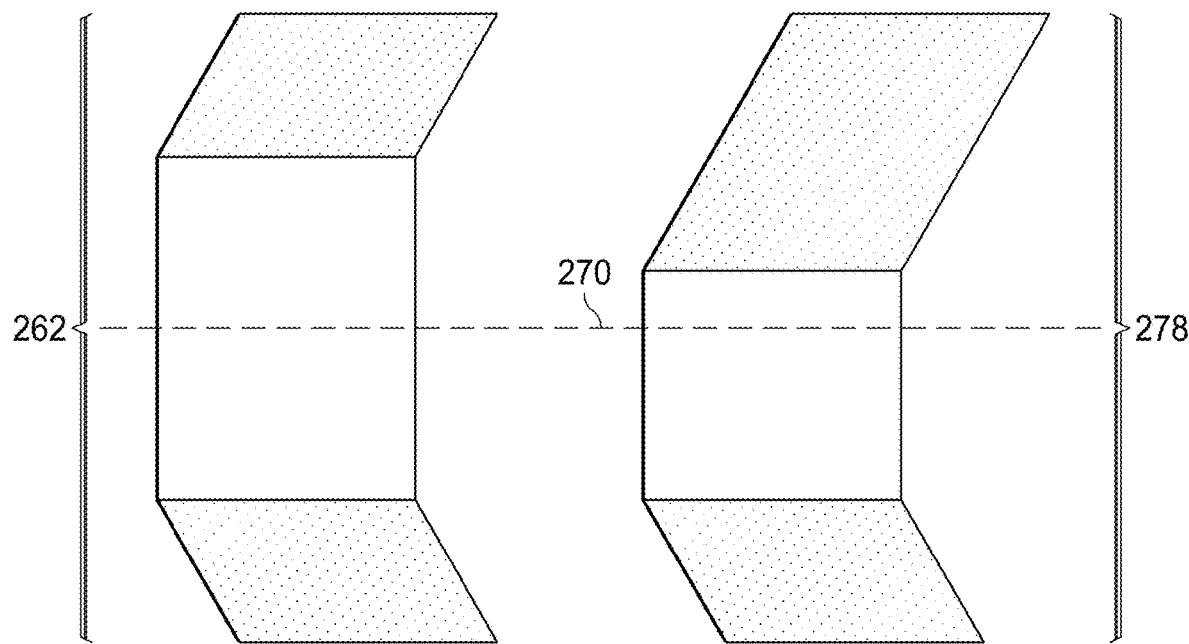
FIGS. 13A-B illustrate example virtual bowl surface configurations.
Figure 13B:
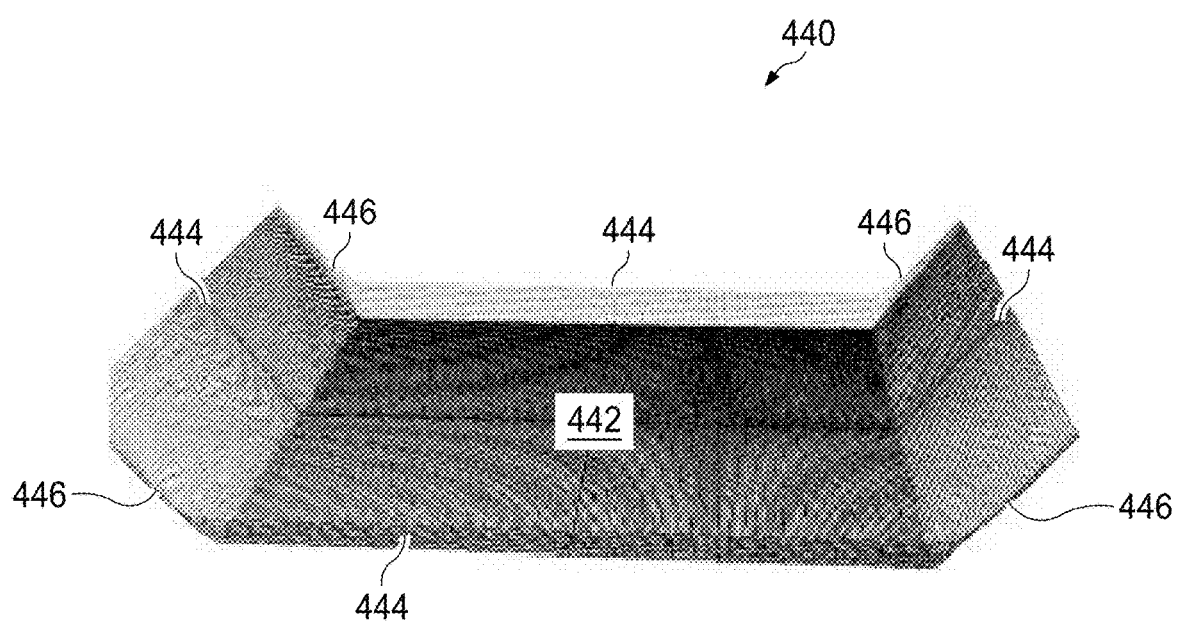

The processor may only update a first portion of the virtual bowl surface in the direction of the detected event while maintaining a second portion of the virtual bowl surface. FIG. 12 illustrates nine segments of a virtual bowl surface, segments 400, 402, 404, 406, 408, 410, 412, 414, and 416. In an example, only the segment(s) of the virtual bowl surface in which the event is detected is updated. FIGS. 13A-B illustrate examples of virtual bowl surfaces. For example, FIG. 13A illustrates a virtual bowl surface 262. When an event is detected above a demarcation 270, the processor updates portions of the virtual bowl surface above the demarcation 270 and does not update portions of the virtual bowl surface below the demarcation 270, to generate an updated virtual bowl surface 278. FIG. 13B illustrates a virtual bowl surface 440, a three dimensional virtual bowl surface. The virtual bowl surface 440 has a bottom 442, which is flat. Also, the virtual bowl surface 440 has four sides 444 extending from the bottom 442, which are also flat. Additionally, four curved or wedge shaped portions 446 connect and blend the sides 444. In other examples, the virtual bowl surface is semispherical or elliptical.

In a block 392, the processor generates an updated bowl to physical camera mapping, for example in the form of a LUT. The processor stores the LUT in memory, for example in double data rate (DDR) SDRAM memory, so multiple processors may access the bowl to physical camera mapping. The LUT provides the physical camera coordinates ($x_2$, $y_2$) as a function of the virtual bowl surface ($x_1$, $y_1$, $z_1$).

In an example, a processor, such as a DSP, is utilized with a peak energy consumption of 66% and an average power consumption of around 6%. This low average load on the processor enables low power consumption on average of less than 10% energy consumption.

Figure 14A:
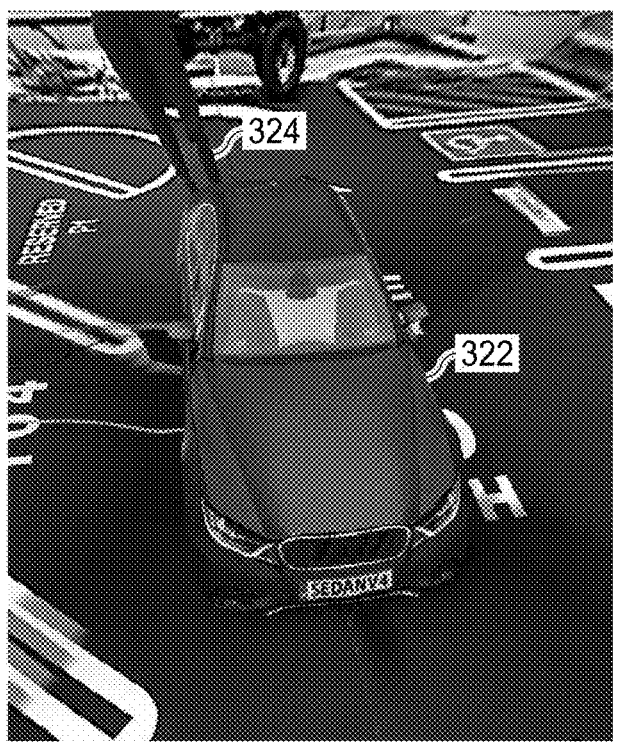
FIGS. 14A-B illustrate an example surround view implementation.
Figure 14B:

FIGS. 14A-B illustrates an example of surround view implementation. FIG. 14A illustrates an original output 320 for surround view from a vehicle 322. A person 324 is highly distorted, because he is rendered with a static virtual bowl surface. FIG. 14B illustrates an example surround view image 330 for the vehicle 332 generated by an example surround view system. A person 334 is not distorted, because he is rendered using an adaptive virtual bowl surface.

Figure 15:
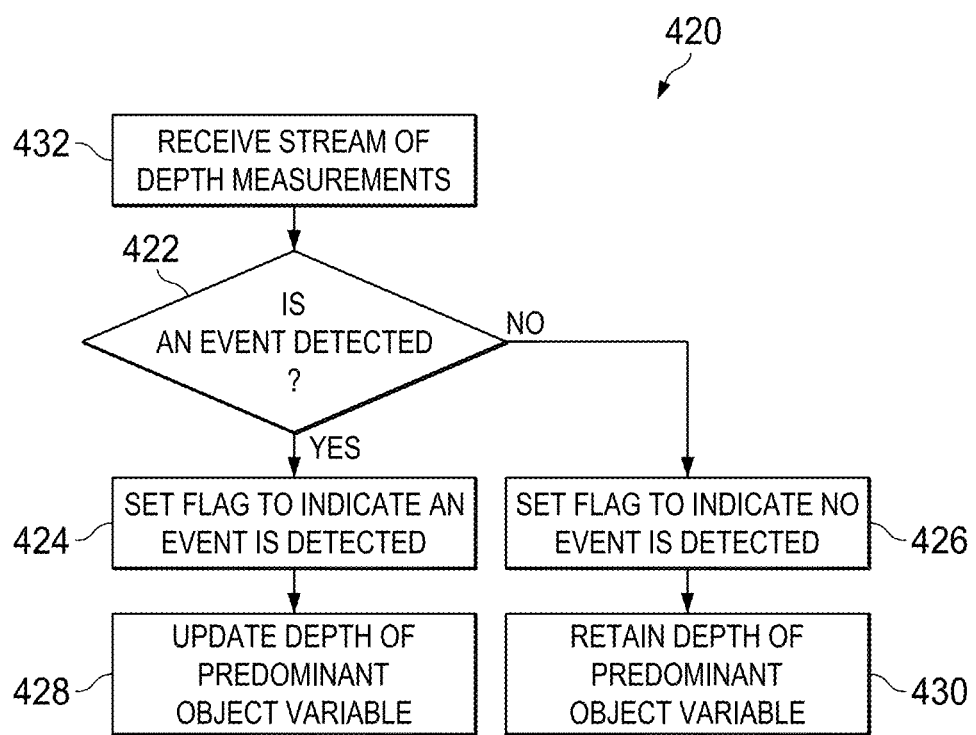
FIG. 15 illustrates a flowchart of an example method of event detection.

FIG. 15 illustrates a flowchart 420 for an example method of event detection. The method illustrated by the flowchart 420 may be performed by a processor of an SoC, for example by a DSP. The method illustrated by the flowchart 420 may be performed for multiple depth sensors in different directions. The DSP may be the DSP 286 illustrated by FIG. 8 or the DSP 204 illustrated by FIG. 6. In a block 432, the processor receives a stream of received depth measurements from a depth sensor. The processor may scale the stream of received depth measurements, converting the depth measurements to grid size using a scaling factor, to generate a stream of corrected depth measurements, indicating the distance between objects and the origin.

In a block 422, the processor determines whether an event is detected, based on the stream of corrected depth measurements or based on the stream of received depth measurements. The processor determines a depth of a flagged object based on the stream of received depth measurements or the stream of corrected depth measurements. The flagged object in a direction may correspond to the largest object, the closest object, or an object otherwise determined to be the flagged object based on a combination of size and distance in the direction. A depth of predominant object variable indicates the depth of a previously flagged object. The processor compares the depth of the flagged object to a depth of a predominant object variable. The processor may retrieve the depth of the predominant object variable from memory. When the difference between the depth of the flagged object and the depth of the predominant object variable is greater than a threshold depth difference, an event is detected, and the processor proceeds to a block 424. On the other hand, when the difference between the depth of the flagged object and the depth of the predominant object variable is less than the threshold depth difference, an event is not detected, and the processor proceeds to a block 426.

In the block 424, the processor sets a flag to indicate that an event is detected. In one example, the processor sets a flag to a first value, for example 1, to indicate that an event is detected. In another example, the processor sets the flag to 0 to indicate that an event is detected.

In a block 428, the processor updates the depth of predominant object variable to be the depth of the flagged object, by storing the depth of the flagged object in memory as the depth of the predominant object variable.

In a block 426, the processor sets the flag to indicate that no event is detected. In one example, the processor sets the flag to a second value, for example 0, to indicate that no event is detected. In another example, the processor sets the flag to 1 to indicate that no event is detected.

In a block 430, the processor retains the depth of the predominant object variable in memory.

Although the example illustrative arrangements have been described in detail, it should be understood that various changes, substitutions and alterations can be made herein without departing from the spirit and scope of the present application as defined by the appended claims.

Moreover, the scope of the present application is not intended to be limited to the particular illustrative example arrangement of the process, machine, manufacture, and composition of matter means, methods and steps described in this specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding example arrangements described herein may be utilized according to the illustrative arrangements presented and alternative arrangements described, suggested or disclosed. Accordingly, the appended claims are intended to include within their scope such processes, machines, manufacture, compositions of matter, means, methods, or steps.

What is claimed is:

1. A system on a chip (SoC) comprising:
a graphics processing unit (GPU); and
a digital signal processor (DSP) coupled to the GPU,
wherein the DSP is configured to:
compare a first depth of a previously flagged object with a second depth of a flagged object;
based on a result of comparing the first and second depths, update a virtual bowl surface to generate an updated virtual bowl surface; and
generate a bowl to physical camera mapping based on the updated virtual bowl surface, and
wherein the GPU is configured to:
perform a physical camera to virtual camera transformation based on the bowl to physical camera mapping to generate an output image.

2. The SoC of claim 1, wherein the DSP is configured to compare the first depth with the second depth in each direction of a plurality of directions.

3. The SoC of claim 1, wherein to generate the updated virtual bowl surface, the DSP is further configured to:
determine a difference between the first and second depths;
determine whether the difference is greater than a threshold value; and
determine whether to generate the updated virtual bowl surface based on a determination of whether the difference is greater than the threshold value, so as to:
responsive to a determination that the difference is greater than the threshold value, generate the updated virtual bowl surface; or
responsive to a determination that the difference is not greater than the threshold value, refrain from generating the updated virtual bowl surface.

4. The SoC of claim 1, wherein the DSP is further configured to:
determine a difference between the first and second depths;
determine whether the difference is greater than a threshold value; and
determine a value for setting a flag based on a determination whether the difference is greater than the threshold value, so as to:
responsive to a determination that the difference is greater than the threshold value, set the flag to a first value to indicate that an event has been detected; or
responsive to a determination that the difference is not greater than the threshold value, set the flag to a second value to indicate that the event has not been detected.

5. The SoC of claim 1, wherein the DSP is further configured to:
   determine the first depth by retrieving a predominant object variable from memory;
   determine a difference between the first and second depths;
   determine whether the difference is greater than a threshold value; and
   determine whether to update the predominant object variable based on a determination whether the difference is greater than the threshold value, so as to:
      responsive to a determination that the difference is greater than the threshold value, store the second depth to the memory as the predominant object variable; or
      responsive to a determination that the difference is not greater than the threshold value, refrain from storing the second depth to the memory as the predominant object variable.

6. The SoC of claim 1, wherein the DSP is further configured to:
   determine that a first object produces a largest signal based on sensor output; and
   set the first object as the flagged object in response to determining that the first object produces the largest signal.

7. The SoC of claim 1, wherein the DSP is further configured to:
   receive a stream of depth measurements;
   generate the first depth of the previously flagged object by applying a low pass filter to the stream of depth measurements; and
   generate the second depth of the flagged object by applying the low pass filter to the stream of depth measurements.

8. The SoC of claim 1, wherein to perform the physical camera to virtual camera transformation, the GPU is configured to perform rasterization with texture mapping using the bowl to physical camera mapping.

9. The SoC of claim 1, wherein the DSP is further configured to:
   receive a stream of depth measurements from a sensor;
   determine whether a first measurement of the stream of received depth measurements corresponds to a first object having a size less than a threshold value; and
   determine whether to discard the first measurement based on a determination whether the size of the first object is less than the threshold value, so as to:
      discard the first measurement in response to a determination that the size of the first object is less than the threshold value; or
      retain the first measurement in response to a determination that the size of the first object is not less than the threshold value.

10. A device comprising:
    one or more processors;
    a memory coupled to the processor; and
    a non-transitory computer readable storage medium storing program instructions that when executed by the processors, cause the processors to:
       compare a first depth of a specified object with a second depth of a flagged object;
       based on a result of comparing the first and second depths, update a virtual bowl surface to generate an updated virtual bowl surface; and
       generate a bowl to physical camera mapping based on the updated virtual bowl surface.

11. The device of claim 10, wherein to compare the first depth with the second depth the program instructions further cause the processors to compare the first depth with the second depth in each direction of a plurality of directions.

12. The device of claim 10, wherein to generate the updated virtual bowl surface the program instructions further cause the processors to:
    determine a difference between the first and second depths;
    determine that the difference is greater than a threshold value; and
    responsive to a determination that the difference is greater than the threshold value, generate the updated virtual bowl surface.

13. The device of claim 10, wherein the program instructions further cause the processors to:
    determine a difference between the first and second depths;
    determine that the difference is greater than a threshold value; and
    responsive to a determination that the difference is greater than the threshold value, set a flag to a value to indicate an event has been detected.

14. The device of claim 10, wherein the program instructions further cause the processors to:
    determine the first depth by retrieving a predominant object variable from the memory;
    determine a difference between the first and second depths;
    determine that the difference is greater than a threshold value; and
    responsive to a determination that the difference is greater than the threshold value, store the second depth to the memory as the predominant object variable.

15. The device of claim 10, wherein the program instructions further cause the processors to:
    determine that a first object produces a largest signal based on sensor output; and
    set the first object as the flagged object in response to determining that the first object produces the largest signal.

16. The device of claim 10, wherein the program instructions further cause the processors to:
    receive a stream of depth measurements;
    generate the first depth of the specified object by applying a low pass filter to the stream of depth measurements; and
    generate the second depth of the flagged object by applying the low pass filter to the stream of depth measurements.

17. The device of claim 10, wherein the program instructions further cause the processors to:
    receive a stream of depth measurements from a sensor;
    determine that a first measurement of the stream of received depth measurements corresponds to a first object having a size less than a threshold value; and
    discard the first measurement in response to a determination that the size of the first object is less than the threshold value.

18. A method comprising:
    comparing a first depth of a specified object with a second depth of a flagged object;
    updating, based on a result of comparing the first and second depths, a virtual bowl surface to generate an updated virtual bowl surface; and
    generating a bowl to physical camera mapping based on the updated virtual bowl surface.

19. The method of claim 18, further comprising:
determining a difference between the first and second depths;
determining whether the difference is greater than a threshold value; and
determining, based on determining whether the difference is greater than the threshold value, whether to:
generate the updated virtual bowl surface; or
refrain from generating the updated virtual bowl surface.

20. The method of claim 18, further comprising:
determining the first depth by retrieving a predominant object variable from memory;
determining a difference between the first and second depths;
determining whether the difference is greater than a threshold value; and
determining, based on determining whether the difference is greater than the threshold value, whether to:
store the second depth to the memory as the predominant object variable; or
refrain from storing the second depth to the memory as the predominant object variable.

\* \* \* \* \*